Jan. 29, 1929.  1,700,133
E. KREISSIG
POWER ABSORBING APPARATUS
Filed June 10, 1925  2 Sheets-Sheet 1

Inventor
Ernst Kreissig
by
attorney

Jan. 29, 1929.  
E. KREISSIG  
1,700,133  
POWER ABSORBING APPARATUS  
Filed June 10, 1925    2 Sheets-Sheet 2

Inventor  
Ernst Kreissig  
by  
attorney

Patented Jan. 29, 1929.

1,700,133

UNITED STATES PATENT OFFICE.

ERNST KREISSIG, OF UERDINGEN, GERMANY, ASSIGNOR TO RINGFEDER G. M. B. H., OF UERDINGEN-ON-THE-RHINE, GERMANY, A JOINT-STOCK COMPANY OF GERMANY.

POWER-ABSORBING APPARATUS.

Application filed June 10, 1925, Serial No. 36,294, and in Germany January 30, 1925.

My invention relates to improvements in power absorbing devices, and more particularly in devices of the type comprising a plurality of coaxial annular members engaging one another with tapering end faces and adapted to be expanded or compressed by the power exerted on the device in axial direction, the power being absorbed by the frictional engagement of the annular members. One of the objects of the improvements is to provide an apparatus of this type which has a high efficiency, and with this object in view my invention consists in providing the said annular members internally or externally, or internally and externally, with a solid cylinder or cylinders in close engagement respectively with the inner and outer circumferential faces of the annular members. Therefore, the annular members are thus forced by expansion or compression into frictional engagement with the said cylindrical member or members, so that the reaction exerted by the apparatus is materially increased. Another feature of the said cylindrical members resides in that the annular members can be more readily assembled, that undue lateral displacement of the members is prevented and said members confined for movement in a fixed working plane, and that no foreign matter has access to the annular members.

Another object of the improvements is to provide a device of the class referred to in which the annular members are more readily returned into initial position after having absorbed a shock, and with this object in view my invention consists in tapering the interengaging end faces of the annular members at different angles.

Figure 7:
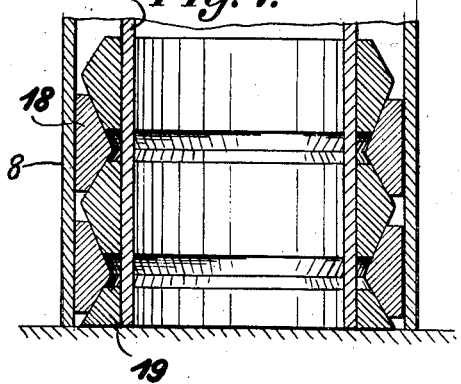
Figure 8:
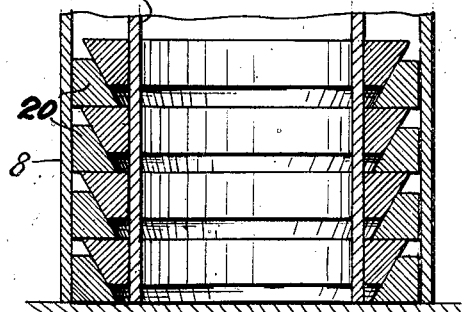

For the purpose of explaining the invention several examples embodying the same have been shown in the accompanying drawings, in which the same reference characters have been used in all the views to indicate corresponding parts. In said drawings, Figs. 1 to 6, are sectional elevations showing various examples embodying the invention, Fig. 7, is a detail sectional elevation showing a modification of the annular members in which the engaging faces are tapered at different angles, and Fig. 8, shows a similar elevation in which the interengaging faces of all the members are tapered to the same side.

Figure 1:
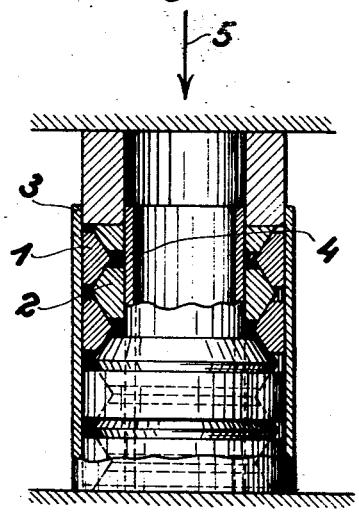

In the example shown in Fig. 1 my improved power absorbing device consists of outer and inner coaxial members 1 and 2 tapered respectively at their inner and outer circumferences from the median part to opposite directions, the tapering faces of the adjacent members being in engagement with one another. In the example shown in Fig. 1 the annular members 1 and 2 are in the form of solid rings. Externally and internally the rings 1 and 2 are engaged by solid cylinders 3 and 4, the cylinder 3 being in close engagement with the outer circumferential faces of the rings 1, and the cylinder 4 being in close engagement with the inner circumferential faces of the inner rings 2. When exerting axial pressure on the device, as is indicated by the arrow 5, the outer rings are subject to circumferential tension and the inner rings to circumferential pressure. Therefore the rings 1 and 2 are forced into frictional engagement respectively with the walls of the cylinders 3 and 4. Thus the friction of the system is materially increased. In case of very heavy axial pressure also the cylinders 3 and 4 are subjected respectively to circumferential tension and pressure.

Figure 2:
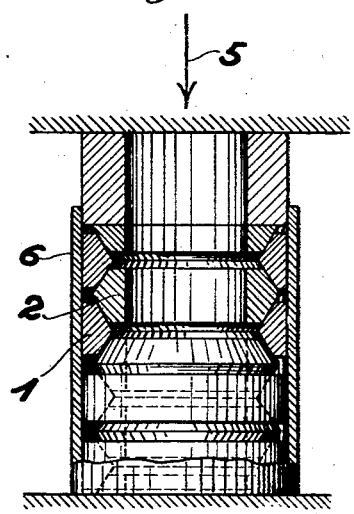

In Fig. 2 I have shown a modification in which only an outer cylinder 6 is provided. Otherwise the construction is similar to the one shown in Fig. 1, and the same letters of reference have been used to indicate corresponding parts. In the construction shown in this figure additional friction is produced only between the outer rings 1 and the cylinder 6.

Figure 3:
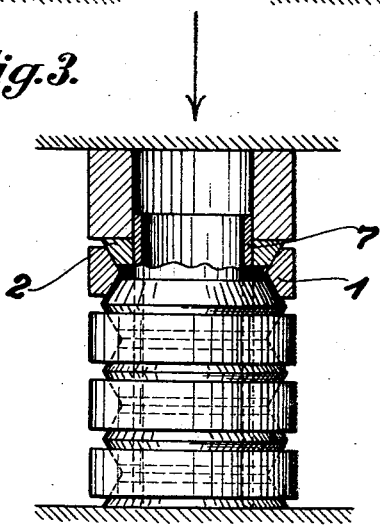
Figure 4:
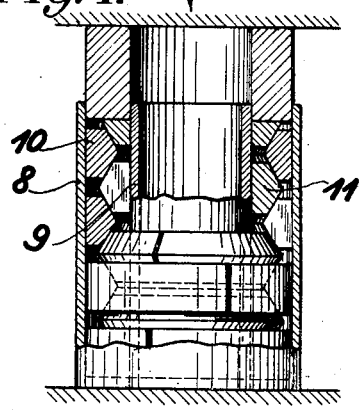

In the modification shown in Fig. 3 only an inner cylinder 7 is provided so that additional friction is produced only between the inner cylinder 7 and the inner rings 2. In the constructions shown in Figs. 1 to 3 the elements of the power absorbing device consist of solid interengaging rings. In the modification shown in Fig. 4 the said annular members are in the form of open rings 10 and 11, which rings are engaged respectively at their inner and outer circumferential faces by solid cylinders 8 and 9. When axially compressing the apparatus the rings 10 and 11 are at first subject to bending stresses, and after the open ends of the rings 11 have met circumferential pressure is produced in the said inner rings. The function of the cylinders 8 and 9 is the same as has been described with reference to Figs. 1 to 3.

Figure 5:
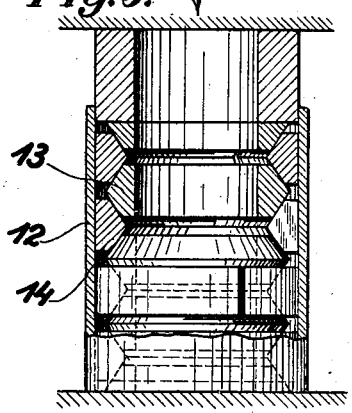

In Fig. 5 I have shown a modification in which the inner annular members are in the form of solid rings and the outer annular members in the form of open rings, and in which only an outer solid cylinder 12 is provided. The function of the apparatus will be understood without further explanation.

Figure 6:
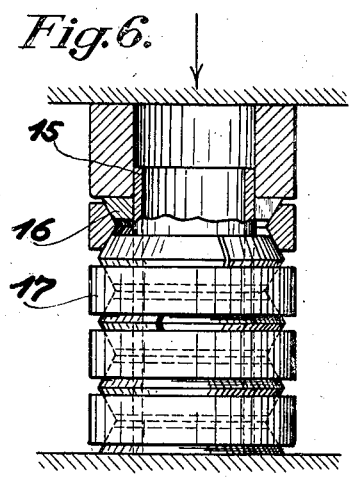

Fig. 6 shows a modification in which the outer annular members are in the form of solid rings 17 while the inner annular members consist of open rings 16, the said inner rings being engaged by a solid cylinder 15.

In Fig. 7 I have shown a preferred construction of the inner and outer annular members, and I wish it to be understood that the said members may be and preferably are used in connection with an outer and inner cylinder or an outer or inner cylinder, as has been described with reference to Figs. 1 to 6. As shown in Fig. 7 the rings are tapered from their median parts at different angles. I have found that by providing interengaging faces of different tapers the rings are more readily separated and returned into initial position after having absorbed a shock. In the example shown in the figure the annular members are in the form of solid rings. But I wish it to be understood that my invention is not limited to this feature.

Fig. 8 shows a modification in which the rings are tapered in one direction from one end face to the other. As shown all the rings are tapered at the same angle. But I wish it to be understood that my invention is not limited to this feature. Also the rings shown in Fig. 8 may be combined with inner and outer or inner or outer solid cylinders.

While in describing the invention reference has been made to several embodiments thereof I wish it to be understood that my invention is not limited to the constructions shown in the drawings, and that various changes may be made in the general arrangement of the device and the construction of its parts within the scope of the appended claims.

I claim:

1. A power absorbing device, comprising coaxial sets of superposed inner and outer independent annular members each in the form of a closed or substantially closed ring and provided with tapering faces in contact with one another, and a solid cylindrical member in constant close frictional engagement with the circumferential faces of a set of said members.

2. A power absorbing device, comprising coaxial sets of superposed independent annular members each in the form of a closed or substantially closed ring and provided with tapering faces in contact with one another, and solid cylindrical members in constant close frictional engagement respectively with the outer and inner circumferential faces of the outer and inner sets of said members.

3. A power absorbing device, comprising coaxial sets of superposed inner and outer independent annular members each in the form of a closed or substantially closed ring and provided with tapering faces in contact with one another, and a solid cylindrical member in constant close frictional engagement with the outer circumferential faces of the outer set of said members.

4. A power absorbing device, comprising coaxial sets of superposed inner and outer independent annular members each in the form of a closed or substantially closed ring and provided with tapering faces in contact with one another, a solid cylindrical member in constant close frictional engagement with the inner circumferential faces of the inner set of said members, and a rigid pressure exerting member directly engaging the upper ring of the inner set of rings.

5. A power absorbing device, comprising coaxial sets of superposed inner and outer independent solid rings formed with tapering faces in contact with one another, the angles included between the axis of the rings and successive pairs of interengaging tapering faces being different, and a solid cylindrical member in close frictional engagement with the outer circumferential faces of the outer set of said rings.

6. A power absorbing device, comprising coaxial sets of superposed inner and outer independent annular members each in the form of a closed or substantially closed ring and provided with tapering faces in contact with one another, the angles included between the axis of the rings and successive pairs of interengaging tapering faces being different, and a solid cylindrical member in close frictional engagement with the circumferential faces of a set of said members.

7. A power absorbing device comprising coaxial sets of superposed ring-shaped members each of unitary construction and having top and bottom faces lying in planes parallel with each other, said members being provided with tapering faces in contact with one another, the angles included between the axis of the rings and successive pairs of interengaging tapering faces being different, and a solid cylindrical member in close frictional engagement with the circumferential faces of a set of said members.

8. A power absorbing device comprising inner and outer coaxial sets of superposed annular members, each of unitary construction and in the form of a closed or substantially closed ring, opposed rings of the sets having tapering faces in contact with one another, the rings of the outer set being of similar construction and interchangeable as to position in the set and the rings of the inner set, except the top and bottom ones, being of similar construction and interchangeable as to position in the set, and the said top and bottom rings being of similar form to each other and interchangeable as to relative positions, the rings of at least one set having circumferential faces concentric with their common axis lying at any point in a common plane parallel with their common axis, and a solid cylindrical member in close frictional contact with the said circumferential faces of the said sets of rings.

9. A power absorbing device, comprising coaxial sets of superposed inner and outer independent annular members each in the form of a closed or substantially closed ring and provided with tapering faces in contact with one another, the angles included between the axis of the rings and successive pairs of interengaging tapering faces being different, and solid cylindrical members in constant close frictional engagement respectively with the outer and inner circumferential faces of the outer and inner sets of said members.

In testimony whereof I affix my signature.

ERNST KREISSIG.